A. HEIL.
GALVANIC CELL.
APPLICATION FILED SEPT. 22, 1910.

1,064,210.

Patented June 10, 1913.

Witnesses:
Victor D. Borst
Wm. Ashley Kelly

Inventor:
Albrecht Heil
by Henry D. Williams
Attorney.

ial.

UNITED STATES PATENT OFFICE.

ALBRECHT HEIL, OF FRANKFORT-ON-THE-MAIN, GERMANY, ASSIGNOR TO CONRAD HUBERT AND SAMUEL STERN, BOTH OF NEW YORK, N. Y.

GALVANIC CELL.

1,064,210.    Specification of Letters Patent.    Patented June 10, 1913.

Application filed September 22, 1910. Serial No. 583,163.

*To all whom it may concern:*

Be it known that I, ALBRECHT HEIL, a subject of the Emperor of Germany, and resident of Frankfort-on-the-Main, Germany, have invented certain new and useful Improvements in Galvanic Cells, of which the following is a specification.

My invention relates to galvanic or voltaic cells, and particularly to those in which a liquid electrolyte is employed, commonly known as wet cells.

My invention has for an object to provide novel and simple means for holding and supporting the electrodes in concentric relation to each other and in the cell so that they will be maintained a constant distance apart throughout their surfaces, and also to insure a free circulation of the electrolyte.

Another and a general object of my invention is to produce a very much higher amperage than has heretofore been possible.

Other objects and advantages of my invention will appear from the following description.

I shall now describe my invention with reference to the accompanying drawings and shall thereafter point out my invention in claims.

Figure 1:
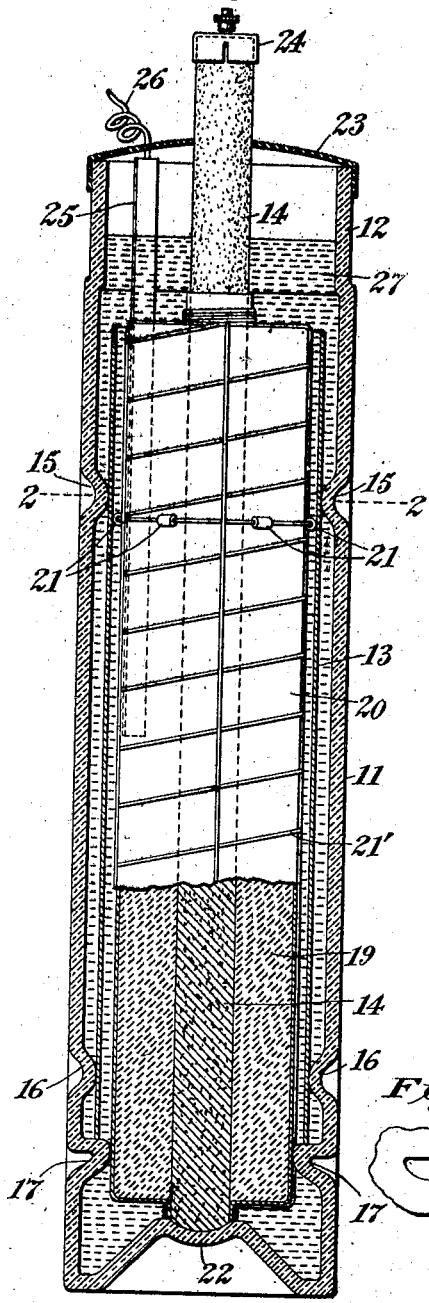
Figure 2:
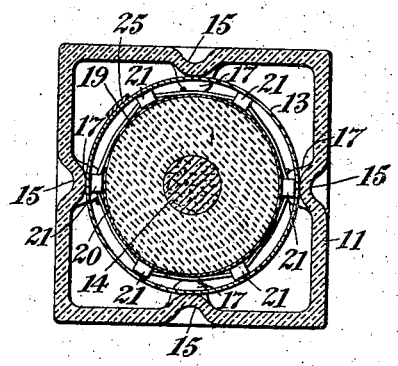
Figure 3:
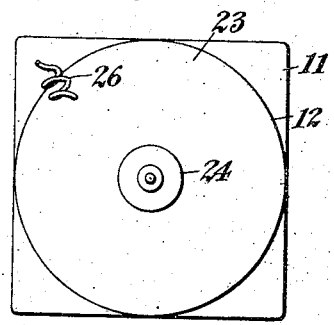
Figure 4:

Figure 1 is a vertical central section of a cell embodying my improvements. Fig. 2 is a horizontal section of the same taken on line 2—2 of Fig. 1. Fig. 3 is a plan view of the same. Fig. 4 is a detail in elevation of one of the larger projections in the containing vessel.

My invention is shown and will be described as embodied in a cell of the Leclanché type, though it is applicable to various kinds of voltaic cells.

In the illustrated embodiment of my invention, I employ a containing vessel or jar 11 of suitable material, preferably glass or other vitreous material. The vessel is shown as made square in cross-section, and formed at its upper end with a slightly restricted cylindrical neck portion 12. The zinc or positive electrode is made in the form of a hollow cylinder 13 of a diameter slightly smaller than that of the neck portion 12 of the casing, and the carbon or negative electrode is a cylindrical stick of carbon 14 situated within the zinc electrode, and extending axially thereof and held substantially concentrically therewith. To hold the zinc electrode 13 concentrically in the vessel or jar 11 the vessel is provided on the inside of its rectangular portion with an upper and lower series of projections 15 and 16, which extend inward to and bear against the zinc electrode and are of the proper length to hold it centrally. The upper series 15 are in a horizontal plane located near the top of the rectangular portion of the vessel and the lower series 16 are in a horizontal plane well down toward the bottom. Each series is shown as consisting of four projections, one on each side wall of the vessel. As a base support for the zinc electrode, and also as centering means for the carbon electrode 14, a third series of projections 17 are formed below the lower series 16. The series 17 correspond in number, and the projections are in a vertical line with those of the other two series, but are longer than the projections of the other two series, and the zinc electrode rests with its bottom on the top of the projections 17, the top of the projections being made flat for this purpose. Thus the zinc electrode is supported clear of the bottom of the vessel, and the supports and centering projections are merely points, so that there is a free circulation of the electrolyte about the zinc electrode. About the carbon electrode 14 is a mass of suitable depolarizing material 19, contained in a bag 20, which is secured on the electrode by a winding or cord or string 21', and is insulated from the zinc electrode 13 by bead-like insulating spacers 21, strung on a cord and tied about the bag of depolarizing material near the top, as shown. The carbon electrode is supported centrally of the vessel 11 and of the zinc electrode 13 by the lowest series of projections 17, which not only serve as the base supports for the zinc electrode, but extend in against the bag of depolarizing material, and are of the proper length to center the carbon. The bottom of the vessel 11 is raised, as shown, and is also provided with a central hollow depression 22 to assist in centering the carbon. The vessel is provided with a suitable cap 23 for closing it, and to further provide for centering the carbon, this cap has a central opening through which the carbon extends a slight distance, the end of the carbon being provided with a metallic cap 24 and a suitable binding post for attaching an electrical conductor. The zinc electrode has a connecting strip of zinc 25 attached to it which extends up to the top of the vessel 11, and the cap 23 has an opening therethrough for the entrance of an electrical conductor 26, which may be electrically connected to the contact strip 25 in any suitable way. The elctrolyte 27 is the usual sal ammoniac solution.

As a means for materially increasing the efficiency of the cell, I also make my improved cell considerably longer than has heretofore been considered possible. It is well known that in zinc-carbon cells, the carbon electrode and the depolarizing mass, together known as the depolarizing electrode, have been restricted to a certain fixed diameter, approximately three to four inches; and hitherto the length of the cell, and hence of the depolarizing electrode, has been limited to about twice the diameter of the depolarizing electrode. I have discovered, however, that by increasing the length of the cell to three, four, and even more times its transverse dimension, when the depolarizing electrode has but slightly smaller transverse dimension than the vessel, the internal resistance is not increased and the amperage of the cell is much increased beyond that which was heretofore considered possible. A cell whose depolarizing electrode has the customary diameter but which has a length of sixteen inches will develop when short circuited a current strength of sixty amperes. With a further increase in the length a correspondingly higher amperage will be obtained. The length may be increased as desired.

It is obvious that various modifications may be made in the construction shown and above particularly described within the principle and scope of my invention.

I claim:

1. In a galvanic cell, in combination, an electrode, a containing vessel and a plurality of centering projections on the inner face of the vessel disposed in a plurality of transverse planes and adapted to hold the electrode substantially concentrically of the vessel at a plurality of separate small contact areas about the electrode and at a plurality of small contact areas along the length of the electrode.

2. In a galvanic cell, in combination, a cylindrical electrode, a containing vessel, a plurality of centering projections on the inner face of the vessel arranged to hold the electrode substantially concentrically of the vessel, and a relatively larger projection on the inner face of the vessel located below the centering projections, the cylindrical electrode being adapted to be supported with its bottom on the larger projection.

3. In a galvanic cell, in combination, a cylindrical electrode, a containing vessel, a plurality of centering projections on the inner face of the vessel arranged to hold the electrode substantially concentrically of the vessel, and a plurality of relatively larger projections on the inner face of the vessel, located in a plane substantially at right angles to the axis of the vessel and below the centering projections and arranged to support the electrode.

4. In a galvanic cell, in combination, a cylindrical electrode, a containing vessel and a plurality of centering projections on the inner face of the vessel arranged in an upper and lower series and providing a plurality of separate small areas of contact about the electrode in each series and adapted to hold the electrode substantially concentrically of the vessel.

5. In a galvanic cell, in combination with a containing vessel, having a central depression in its bottom, a hollow cylindrical positive electrode, a negative electrode adapted to be situated interiorly of the positive electrode and to rest with its lower end in the depression in the bottom of the vessel, and a plurality of projections on the inner face of the containing vessel arranged transversely of the axis of the vessel so as to provide a plurality of separate small areas of contact adapted to hold the positive electrode concentrically of the negative electrode.

6. In a galvanic cell, in combination with a containing vessel, having a central depression in its bottom, a hollow cylindrical positive electrode, a negative electrode adapted to be situated interiorly of the positive electrode and to rest with its lower end in the depression in the bottom of the vessel, a plurality of projections on the inner face of the containing vessel arranged to hold the positive electrode concentrically of the vessel, and a plurality of relatively larger projections on the inner face of the vessel located in a plane substantially at right angles to the axis of the vessel and below the centering projections and adapted to support the cylindrical electrode.

7. In a galvanic cell, in combination with a containing vessel having a central depression in its bottom, an electrode adapted to rest with its lower end in the depression in the bottom of the vessel, and a plurality of projections on the inner face of the vessel arranged to engage the electrode and hold it substantially concentrically of the vessel with its lower end in the depression in the bottom of the vessel.

8. In a galvanic cell, in combination with a containing vessel, a hollow cylindrical positive electrode, a negative electrode situated interiorly of the positive electrode, a plurality of centering projections on the inner face of the vessel for the positive electrode, and a plurality of relatively larger projections on the inner face of the vessel located below the first named projections and arranged to hold the negative electrode substantially concentrically of the positive electrode and to support the positive electrode.

9. In a galvanic cell, in combination with a containing vessel having a central depression in its bottom, a hollow cylindrical zinc electrode, a carbon electrode situated interiorly of the zinc electrode and adapted to rest with its lower end in the depression in the bottom of the vessel, a mass of depolarizing material suitably secured about the carbon electrode, a plurality of centering projections on the inner face of the vessel for the zinc electrode, and a plurality of larger projections on the inner face of the vessel located below the first named projections and arranged to hold the carbon electrode substantially concentrically of the zinc electrode and to support the zinc electrode.

10. In a wet galvanic cell, in combination with a suitable containing vessel composed of vitreous material and having a central depression in its bottom, a hollow cylindrical zinc electrode, a carbon electrode situated interiorly of the zinc electrode and adapted to rest with its lower end in the depression in the bottom of the vessel, a plurality of centering projections formed in the vessel and extending inwardly and engaging the zinc electrode, and a plurality of larger projections similarly formed in the vessel and arranged to hold the carbon electrode substantially concentrically of the zinc electrode and to support the zinc electrode.

11. In a wet galvanic cell, in combination with a suitable containing vessel composed of vitreous material and having a central depression in its bottom, a hollow cylindrical zinc electrode, a carbon electrode situated interiorly of the zinc electrode and adapted to rest with its lower end in the depressions in the bottom of the vessel, a mass of depolarizing material suitably supported about the carbon electrode, a plurality of centering projections formed in the vessel and extending inwardly and engaging the zinc electrode, and a plurality of larger projections formed in the vessel and extending inwardly to the depolarizing mass, and arranged to hold the carbon electrode in the bottom of the vessel and to support the zinc electrode.

12. In a wet galvanic cell, in combination with a suitable containing vessel composed of vitreous material and having a central depression in its bottom and a cap having a central opening therein, a hollow cylindrical zinc electrode, a carbon electrode situated interiorly of the zinc electrode and adapted to rest with its lower end in the depression in the bottom of the vessel and to extend with its upper end through the opening in the cap, a mass of depolarizing material suitably supported about the carbon electrode, a plurality of centering projections formed in the vessel and extending inwardly and engaging the zinc electrode and a plurality of larger projections formed in the vessel and extending inwardly to the depolarizing mass, and arranged to hold the carbon electrode in the depression in the bottom of the vessel and to support the zinc electrode.

13. A wet galvanic cell, comprising, in combination with a rectangular containing vessel composed of vitreous material and having a restricted cylindrical neck portion and a central hollow depression in its bottom, a cap for the vessel having a central opening therein, and a suitable electrolyte, a hollow zinc electrode, a carbon electrode disposed interiorly of the zinc electrode and arranged to extend with its upper end through the opening in the cap and to rest with its lower end in the hollow depression in the bottom of the vessel, a mass of depolarizing material suitably supported about the carbon electrode, a plurality of centering projections formed in the vessel and adapted to engage the zinc electrode, and a plurality of larger projections formed in the vessel in the plane below the first named projections and extending inwardly to the depolarizing mass and arranged to hold the carbon electrode with its bottom in the hollow depression in the bottom of the vessel and to support the zinc electrode.

14. A wet galvanic cell comprising, in combination with a suitable electrolyte, a containing vessel having a plurality of electrode centering projections in its vertical walls and a central hollow depression in its bottom, a negative electrode resting in the hollow depression in the bottom of the vessel and extending axially the full length of the vessel, and a positive electrode substantially surrounding the negative electrode, the electrodes being held substantially concentrically of each other by the electrode-centering projections.

15. A wet galvanic cell comprising, in combination with a suitable electrolyte, a containing vessel of a length exceeding twice its transverse dimensions and having a plurality of electrode-centering projections in its vertical walls and a central hollow depression in its bottom, a negative electrode resting in the hollow depression in the bottom of the vessel and extending axially the full length of the vessel, and a positive electrode substantially surrounding the negative electrode, the electrodes being held substantially concentrically of the vessel by the electrode-centering projections.

In testimony whereof I have signed my name to this specification in the presence of two subscribing witnesses.

ALBRECHT HEIL.

Witnesses:
   FRANZ HASSLACHER,
   ERWIN DIPPEL.